US010073852B2

(12) United States Patent
Hanamoto et al.

(10) Patent No.: US 10,073,852 B2
(45) Date of Patent: Sep. 11, 2018

(54) COMPUTER-READABLE STORAGE MEDIUM, FILE MANAGEMENT APPARATUS, AND FILE MANAGEMENT METHOD

(71) Applicants: FUJITSU LIMITED, Kawasaki-shi, Kanagawa (JP); HONDA MOTOR CO., LTD., Minato-ku, Tokyo (JP)

(72) Inventors: Kazuhisa Hanamoto, Kawasaki (JP); Masayuki Okishio, Utsunomiya (JP); Yasuo Kurosaki, Wako (JP); Hiroshi Ishida, Wako (JP)

(73) Assignees: FUJITSU LIMITED, Kawasaki (JP); HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 14/138,751

(22) Filed: Dec. 23, 2013

(65) Prior Publication Data

US 2014/0188950 A1 Jul. 3, 2014

(30) Foreign Application Priority Data

Dec. 28, 2012 (JP) ................................ 2012-289100

(51) Int. Cl.
*G06F 17/30* (2006.01)

(52) U.S. Cl.
CPC .. *G06F 17/30091* (2013.01); *G06F 17/30595* (2013.01); *G06F 17/30952* (2013.01)

(58) Field of Classification Search
None
See application file for complete search history.

(56) References Cited

U.S. PATENT DOCUMENTS 6,539,347 B1 * 3/2003 Paterson .................. G06F 8/34 703/22
8,136,031 B2 * 3/2012 Massand ............ G06F 17/2211 715/212
9,582,782 B2 * 2/2017 Bhide ............... G06Q 10/0639
2005/0154606 A1 * 7/2005 Terzidis ................ G06Q 99/00 715/853

(Continued)

FOREIGN PATENT DOCUMENTS

JP 2001-325278 11/2001
JP 2002-149648 5/2002
JP 2004-86782 3/2004

OTHER PUBLICATIONS

Japanese Office Action dated Oct. 4, 2016 in corresponding Japanese Patent Application No. 2012-289100.

(Continued)

*Primary Examiner* — Christopher J Raab
(74) *Attorney, Agent, or Firm* — Staas & Halsey LLP

(57) ABSTRACT

A storage unit stores therein information for specifying a cell contained in a file in a table format and attribute information on the file in an associated manner. When first information is stored in the storage unit in association with attribute information on a first file in a table format and second information is stored in the storage unit in association with attribute information on a second file in a table format, whether there is a relevance between the first file and the second file is determined by comparing the first information and the second information by referring to the storage unit.

8 Claims, 13 Drawing Sheets

ELEMENT INFORMATION 32

| Object ID | Key | Detail |
|---|---|---|
| 0001 | ID 001 | PROCEED |
| 0002 | ID 002 | STOP |
| 0003 | ID 003 | ACCELERATE |
| 0004 | No A | REQUIREMENT A |
| 0005 | No B | REQUIREMENT B |
| 0006 | No C | REQUIREMENT C |
| 0007 | ID 001-01 | FUNCTION A |
| 0008 | ID 001-02 | FUNCTION B |
| 0009 | ID 002-01 | FUNCTION C |
| | | |

RELATION INFORMATION 34

| Relation Parent ID | Relation Child ID |
|---|---|
| ID 001 | ID 001-01 |
| ID 001 | ID 001-02 |
| ID 002 | ID 002-01 |

(56) References Cited

U.S. PATENT DOCUMENTS

2006/0004686 A1* 1/2006 Molnar ............ G06F 17/30297
2008/0120319 A1* 5/2008 Drews ............... G06F 17/30699
2010/0185967 A1* 7/2010 Noda ................ G06F 17/30126
715/770
2011/0137957 A1* 6/2011 Ryan ................. G06F 17/30398
707/805
2011/0219038 A1* 9/2011 Behal ..................... G06F 17/30
707/794
2012/0124081 A1* 5/2012 Ebrahimi .......... G06F 17/30569
707/769
2012/0221509 A1* 8/2012 Gao .................. G06F 17/30563
707/602
2012/0330976 A1* 12/2012 Tsuchida ............. G06F 17/2276
707/749
2013/0060825 A1* 3/2013 Farcasiu ........... G06F 17/30557
707/812

OTHER PUBLICATIONS

Chinese Office Action dated Aug. 3, 2016 in corresponding Chinese Patent Application No. 201310741351.3.
Chinese Office Action dated Apr. 5, 2017 in related Chinese Application No. 201310741351.3.
Japanese Office Action dated May 24, 2016 in corresponding Japanese Patent Application No. 2012-289100.

* cited by examiner

| Format type | Key | Contents |
|---|---|---|
| FUNCTIONAL REQUIREMENT DOCUMENT A | ID | REQUIREMENT |
| FUNCTIONAL REQUIREMENT DOCUMENT B | NO | DESCRIPTION |
| FUNCTIONAL DESIGN DOCUMENT | ID | DETAILS |
| | | |

| Object ID | Key | Detail |
|---|---|---|
| 0001 | ID 001 | PROCEED |
| 0002 | ID 002 | STOP |
| 0003 | ID 003 | ACCELERATE |
| 0004 | No A | REQUIREMENT A |
| 0005 | No B | REQUIREMENT B |
| 0006 | No C | REQUIREMENT C |
| 0007 | ID 001-01 | FUNCTION A |
| 0008 | ID 001-02 | FUNCTION B |
| 0009 | ID 002-01 | FUNCTION C |
| | | |

| File Name | ID |
|---|---|
| FUNCTIONAL REQUIREMENT DOCUMENT A | ID 001 |
| FUNCTIONAL REQUIREMENT DOCUMENT A | ID 002 |
| FUNCTIONAL REQUIREMENT DOCUMENT A | ID 003 |
| FUNCTIONAL REQUIREMENT DOCUMENT B | No A |
| FUNCTIONAL REQUIREMENT DOCUMENT B | No B |
| FUNCTIONAL REQUIREMENT DOCUMENT B | No C |
| FUNCTIONAL DESIGN DOCUMENT | ID 001-01 |
| FUNCTIONAL DESIGN DOCUMENT | ID 001-02 |
| FUNCTIONAL DESIGN DOCUMENT | ID 002-01 |
| | |

| Relation Parent ID | Relation Child ID |
|---|---|
| ID 001 | ID 001-01 |
| ID 001 | ID 001-02 |
| ID 002 | ID 002-01 |
| | |

FUNCTIONAL REQUIREMENT DOCUMENT A
FUNCTIONAL REQUIREMENT DOCUMENT B
FUNCTIONAL DESIGN DOCUMENT
(2) EXTRACTION
(1) REFERENCE
EXTRACTING UNIT
40
(3) STORAGE
23
FORMAT INFORMATION
31
ELEMENT INFORMATION
32
FILE INFORMATION
33

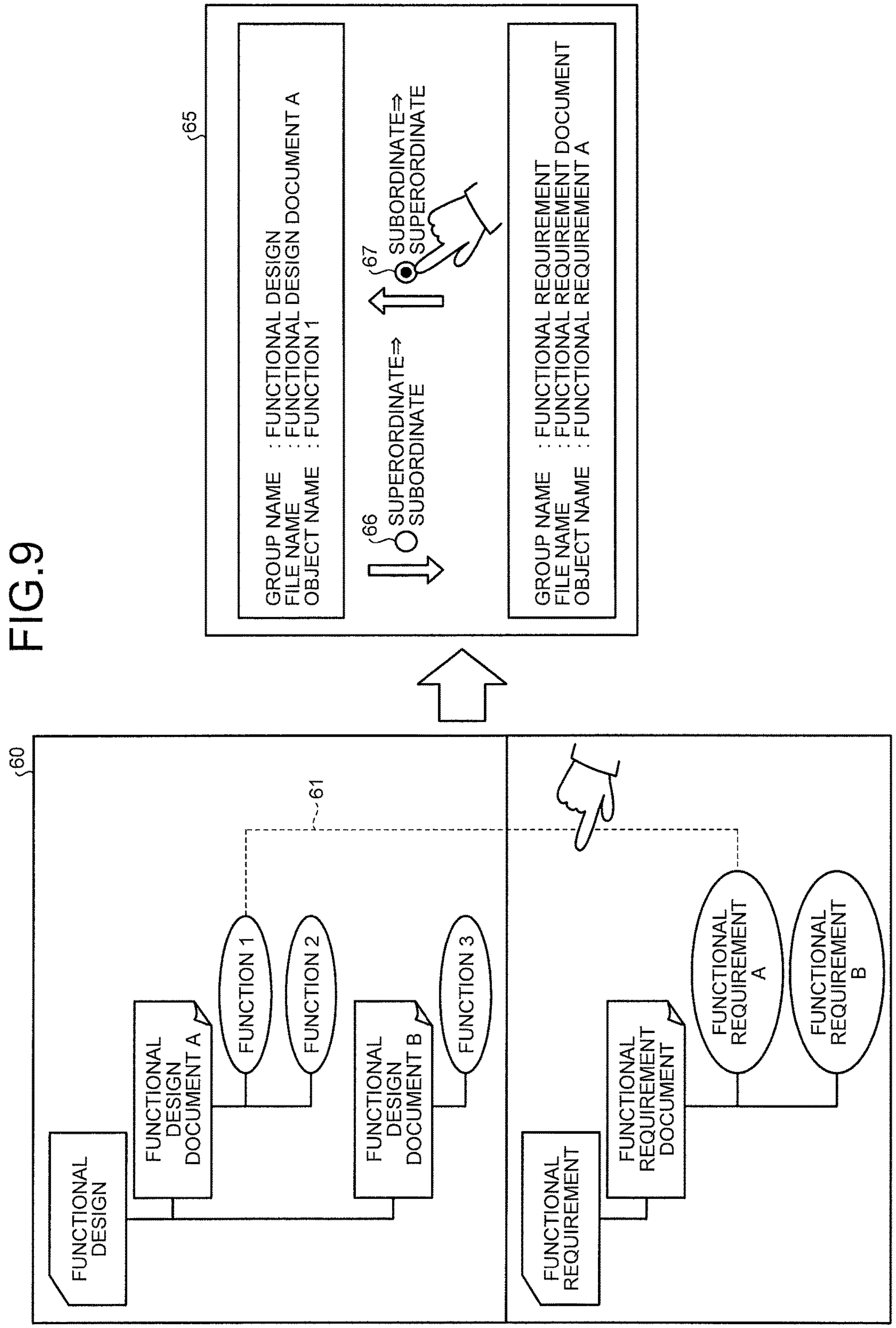

FIG.9
60
FUNCTIONAL DESIGN
FUNCTIONAL DESIGN DOCUMENT A
FUNCTIONAL DESIGN DOCUMENT B
FUNCTION 1
FUNCTION 2
FUNCTION 3
61
FUNCTIONAL REQUIREMENT
FUNCTIONAL REQUIREMENT DOCUMENT
FUNCTIONAL REQUIREMENT A
FUNCTIONAL REQUIREMENT B
65
GROUP NAME : FUNCTIONAL DESIGN
FILE NAME : FUNCTIONAL DESIGN DOCUMENT A
OBJECT NAME : FUNCTION 1
66
SUPERORDINATE⇒ SUBORDINATE
67
SUBORDINATE⇒ SUPERORDINATE
GROUP NAME : FUNCTIONAL REQUIREMENT
FILE NAME : FUNCTIONAL REQUIREMENT DOCUMENT
OBJECT NAME : FUNCTIONAL REQUIREMENT A

FIG.12

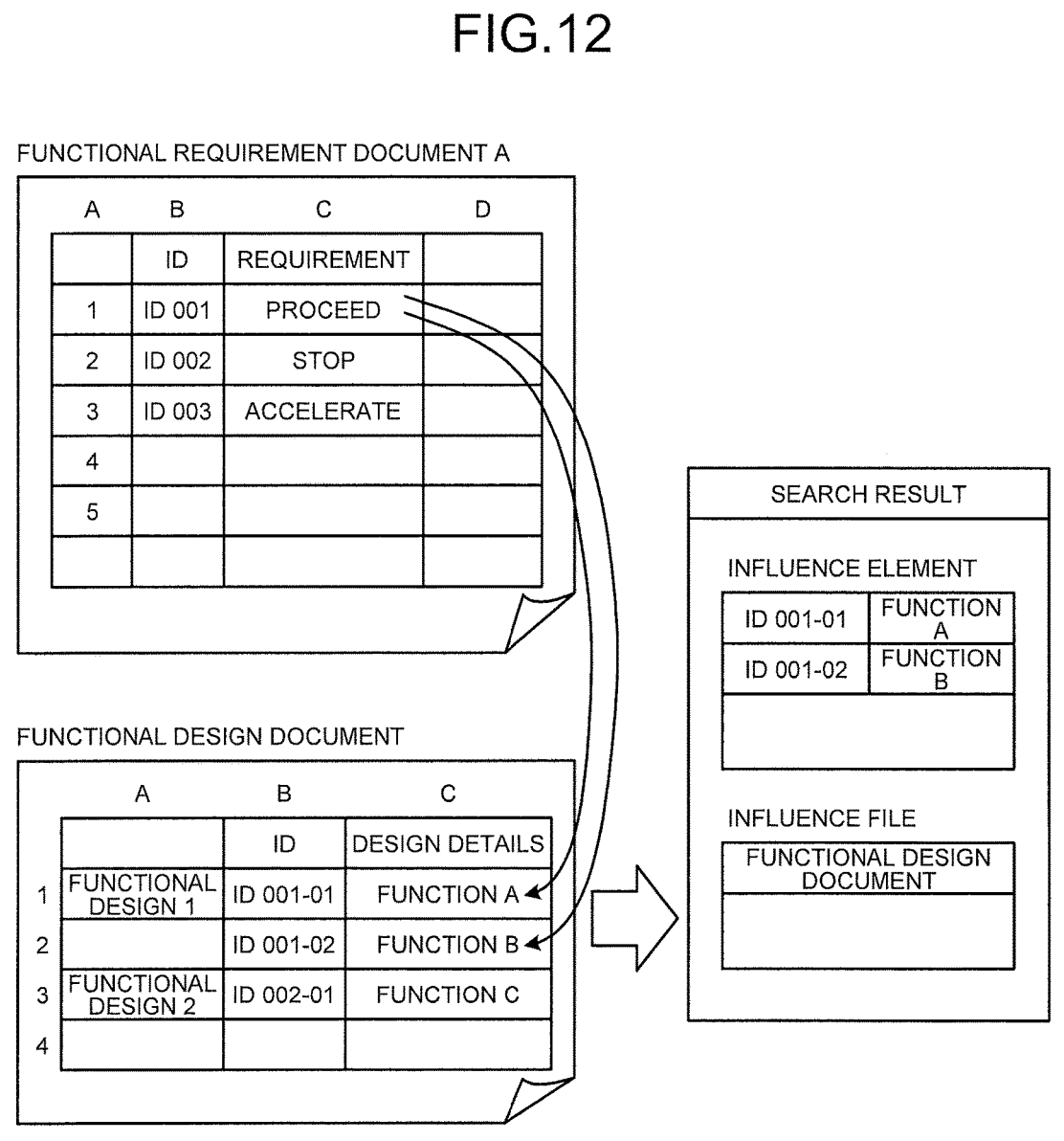

FUNCTIONAL REQUIREMENT DOCUMENT A

| | A | B | C | D |
|---|---|---|---|---|
| | | ID | REQUIREMENT | |
| | 1 | ID 001 | PROCEED | |
| | 2 | ID 002 | STOP | |
| | 3 | ID 003 | ACCELERATE | |
| | 4 | | | |
| | 5 | | | |
| | | | | |

FUNCTIONAL DESIGN DOCUMENT

| | A | B | C |
|---|---|---|---|
| | | ID | DESIGN DETAILS |
| 1 | FUNCTIONAL DESIGN 1 | ID 001-01 | FUNCTION A |
| 2 | | ID 001-02 | FUNCTION B |
| 3 | FUNCTIONAL DESIGN 2 | ID 002-01 | FUNCTION C |
| 4 | | | |

SEARCH RESULT

INFLUENCE ELEMENT

| | |
|---|---|
| ID 001-01 | FUNCTION A |
| ID 001-02 | FUNCTION B |
| | |

INFLUENCE FILE

| |
|---|
| FUNCTIONAL DESIGN DOCUMENT |
| |

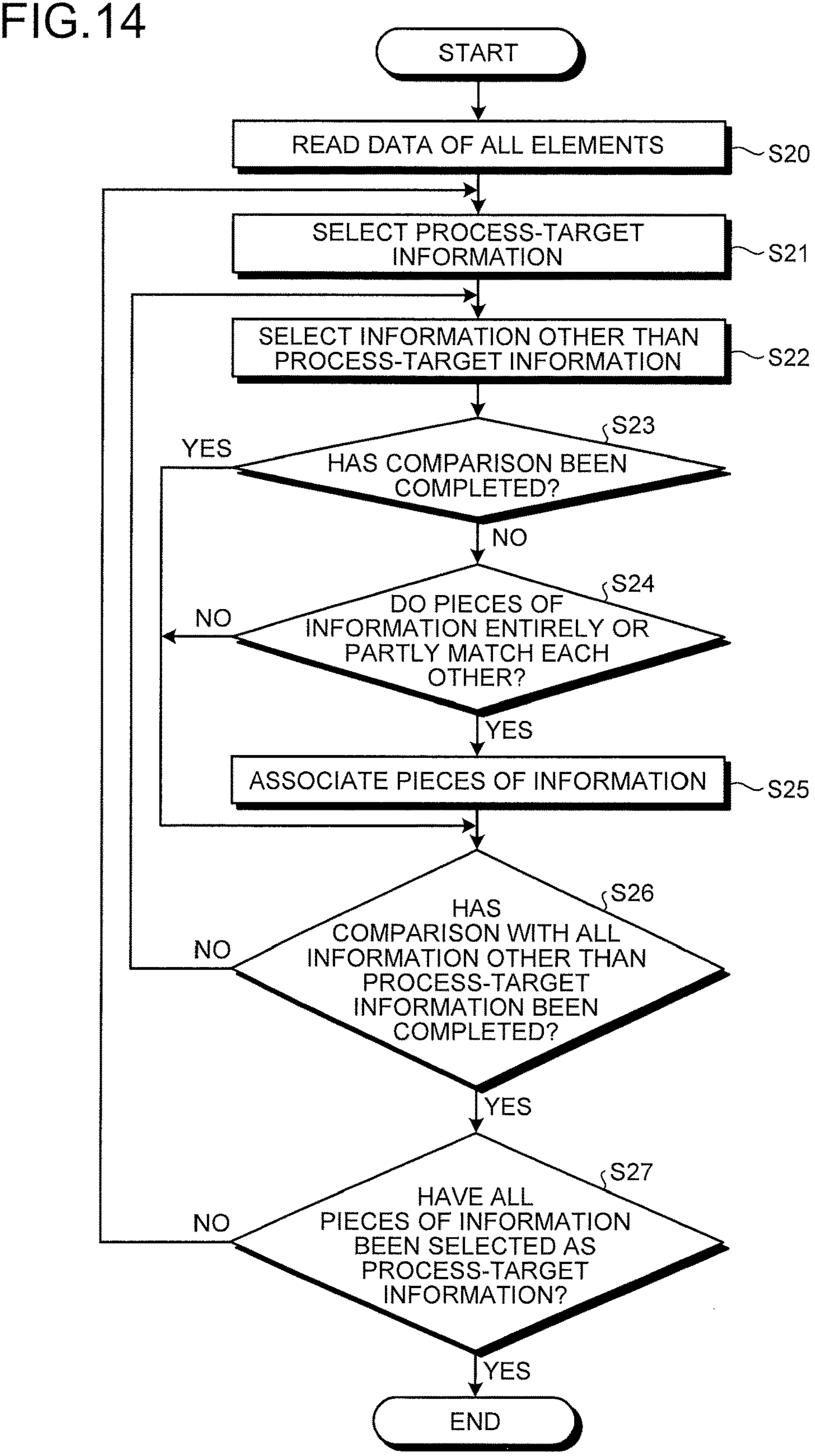
FIG.14
START
READ DATA OF ALL ELEMENTS
S20
SELECT PROCESS-TARGET INFORMATION
S21
SELECT INFORMATION OTHER THAN PROCESS-TARGET INFORMATION
S22
S23
HAS COMPARISON BEEN COMPLETED?
YES
NO
S24
DO PIECES OF INFORMATION ENTIRELY OR PARTLY MATCH EACH OTHER?
NO
YES
ASSOCIATE PIECES OF INFORMATION
S25
S26
HAS COMPARISON WITH ALL INFORMATION OTHER THAN PROCESS-TARGET INFORMATION BEEN COMPLETED?
NO
YES
S27
HAVE ALL PIECES OF INFORMATION BEEN SELECTED AS PROCESS-TARGET INFORMATION?
NO
YES
END

COMPUTER-READABLE STORAGE MEDIUM, FILE MANAGEMENT APPARATUS, AND FILE MANAGEMENT METHOD

CROSS-REFERENCE TO RELATED APPLICATIONS

This application is based upon and claims the benefit of priority of the prior Japanese Patent Application No. 2012-289100, filed on Dec. 28, 2012, the entire contents of which are incorporated herein by reference.

FIELD

The embodiments discussed herein are directed to a file management program, a file management apparatus, and a file management method.

BACKGROUND

In design and development of a control system and an embedded system in the automobile industry, the electronics/precision industry, or the like, various documents, such as specification documents, design documents, or test specification documents, generated through design and development processes are managed. Therefore, in the system design, in some cases, a file management apparatus manages a large number of documents.

The file management apparatus can store information on association between files through a file association process performed by an operator. In this configuration, when one of the files is modified, the file management apparatus can search for a file influenced by the modification.

Patent Literature 1: Japanese Laid-open Patent Publication No. 2002-149648

However, to associate files, the operator searches for related portions by referring to each of the files, and associate the files with the related portions. Therefore, it takes effort and time to associate the files. For example, if a document is generated in a table format file, related portions are searched for from a large number of cells; therefore, it is cumbersome to search for the related portions.

SUMMARY

According to an aspect of an embodiment, non-transitory computer-readable recording medium having stored therein a file management program for causing a computer to execute a process, the process includes referring a storage unit that stores therein information for specifying a cell contained in a file in a table format and attribute information on the file in an associated manner; and determining, when first information is stored in the storage unit in association with attribute information on a first file in a table format and second information is stored in the storage unit in association with attribute information on a second file in a table format, whether there is a relevance between the first file and the second file by comparing the first information and the second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of format information;

FIG. 4 is a diagram illustrating an example of a data structure of element information;

FIG. 5 is a diagram illustrating an example of a data structure of file information;

FIG. 6 is a diagram illustrating an example of a data structure of relation information;

FIG. 9 is a diagram illustrating an example of a designation screen;

FIG. 12 is a diagram illustrating an example of the flow to search for an area to be influenced;

FIG. 14 is a flowchart illustrating the flow of an association process;

DESCRIPTION OF EMBODIMENTS

Preferred embodiments of the present invention will be explained with reference to accompanying drawings. The present invention is not limited to the embodiments below. The embodiments may be combined appropriately as long as the processes do not conflict with one another.

[a] First Embodiment

Figure 1:
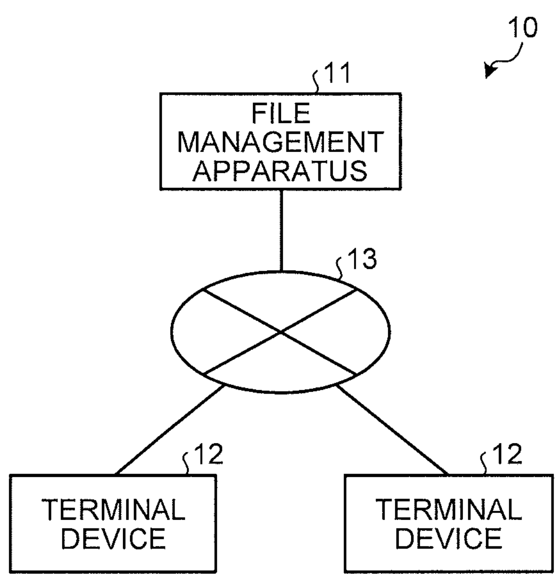
FIG. 1 is a diagram illustrating an example of a schematic configuration of an entire system including a file management apparatus.

A system according to a first embodiment will be explained. FIG. 1 is a diagram illustrating an example of a schematic configuration of an entire system including a file management apparatus. As illustrated in FIG. 1, a system 10 includes a file management apparatus 11 and terminal devices 12. The file management apparatus 11 and the terminal devices 12 can exchange various types of information with one another. For example, the file management apparatus 11 and the terminal devices 12 are connected to one another via a network 13 in a communicable manner, and can exchange various types of information with one another. The network 13 may be any communication network, such as a local area network (LAN) or a virtual private network (VPN), regardless of whether it is wired or wireless. In the example in FIG. 1, the system 10 includes the two terminal devices 12; however, the disclosed system is not limited to this example and may include an arbitrary number of the terminal devices 12.

The terminal devices 12 are computers used by developers who perform development. The terminal devices 12 are, for example, information processing apparatuses such as desktop personal computers (PC), tablet PCs, or notebook PCs. A developer generates various documents by the terminal devices 12 during the development. For example, the developer generates various documents, such as a functional requirement document for describing requirements for functions needed for the development, a functional design document for designing each of the functions, and a test specification document for testing whether each of the functions is realized, according to each stage of the development. In the documents generated through the development as described above, contents to be described, written portions, styles, and the like are determined for each of specific categories, such as a document type, a development timing, and a development agent, to unify a description format. By unifying the description format for each type of a document, all of the documents of the same type can contain the same items; therefore, it becomes possible to prevent omission of an item that needs to be described. Furthermore, by unifying the description format for each type of a document, it becomes possible to promptly refer to a target written portion when checking the contents of the documents of the same type; therefore, it becomes possible to easily check the contents. The developer generates the documents according to document formats by using software that enables to generate a document in a table format. Examples of the software that enables to generate a document in a table format include spreadsheet software such as Microsoft Excel (registered trademark). Incidentally, the development includes not only software development but also hardware development. For example, in the development of an automobile, hardware development and software development are performed in order to realize needed functions. Furthermore, each of the documents may be generated by using a document of related development. For example, in the development of an automobile, if a new car model is developed by using or modifying a certain component of an already-developed car model, a document of the new car model is generated by using a document of the component of the already-developed car model.

The file management apparatus 11 manages a file of a document. The file management apparatus 11 is, for example, a computer such as a server computer. The file management apparatus 11 may be implemented by a single computer or a cloud computing including multiple computers. In the first embodiment, an example is explained in which the file management apparatus 11 is implemented by a single computer. The file management apparatus 11 can manage documents by classifying the documents into groups. For example, the file management apparatus 11 manages documents by classifying the documents for each development process. The file management apparatus 11 provides separate folders to receive registration of documents for the respective groups, and receives registration of documents from the terminal device 12. When a developer generates or modifies a document by the terminal device 12, he/she registers a file of the document in a table format in a folder corresponding to the type of the document. When a file of a new document is registered in the folder, the file management apparatus 11 stores the registered file of the document. Furthermore, when an already-registered document is newly registered in the folder, the file management apparatus 11 compares the already-registered document and the newly-registered document to specify a modified portion and modified contents. Then, the file management apparatus 11 stores, as a modification history, the modified portion and the modified contents specified as above, together with the newly-registered document.

The file management apparatus 11 determines a relevance between the files of the registered documents. As a result of the determination, the file management apparatus 11 manages the files containing related portions, in an associated manner.

Figure 2:
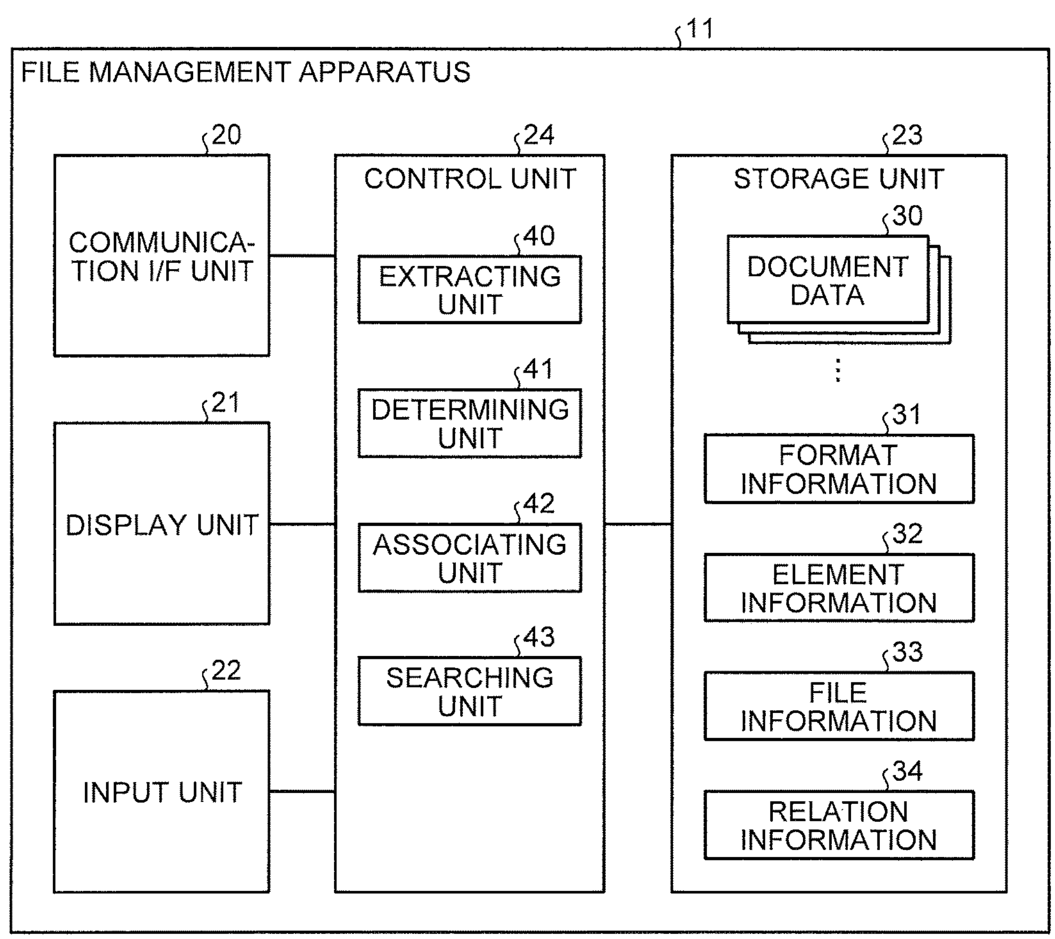
FIG. 2 is a diagram illustrating an overall configuration of the file management apparatus.

The file management apparatus 11 according to the first embodiment will be explained below. FIG. 2 is a diagram illustrating an overall configuration of the file management apparatus. As illustrated in FIG. 2, the file management apparatus 11 includes a communication interface (I/F) unit 20, a display unit 21, an input unit 22, a storage unit 23, and a control unit 24.

The communication I/F unit 20 is an interface for controlling communication with other devices, such as the terminal devices 12. The communication I/F unit 20 transmits and receives various types of information to and from the other devices via the network 13. For example, the communication I/F unit 20 receives a file of a document in a table format from the terminal device 12 via the network 13. As an example of the communication I/F unit 20, a network interface card, such as a LAN card, may be employed.

The display unit 21 is a display device that displays various types of information. Examples of the display device serving as the display unit 21 include a liquid crystal display (LCD) and a cathode ray tube (CRT). The display unit 21 displays various types of information.

The input unit 22 is an input device that inputs various types of information. Examples of the input device serving as the input unit 22 include a mouse and a keyboard. The input unit 22 receives input of operation from a user, and inputs operation information indicating the contents of the received operation to the control unit 24.

The storage unit 23 is a storage device, such as a hard disk, a solid state drive (SSD), or an optical disk. The storage unit 23 may be a data-rewritable semiconductor memory, such as a random access memory (RAM), a flash memory, or a non-volatile static random access memory (NVSRAM).

The storage unit 23 stores therein an operating system (OS) and various programs used for file management, which are executed by the control unit 24. Furthermore, the storage unit 23 stores therein various types of data used in the programs executed by the control unit 24. For example, the storage unit 23 stores therein document data 30, format information 31, element information 32, file information 33, and relation information 34.

The document data 30 is data of a file of a registered document. For example, the document data 30 is stored when the terminal device 12 registers a file of a document in a document registration folder. Furthermore, the document data 30 is referred to by an extracting unit (to be described later) when an element in the document is to be extracted.

The format information 31 is data, in which information on an element to be associated in a file in a table format is stored for each of description formats of documents. Incidentally, in a design process of the development, a requirement needed for the development is determined and a function for concretely realizing the requirement is designed. Then, in a test process, a test is performed to check whether the designed function is implemented and whether the requirement needed for the function is satisfied. As described above, in some cases, the requirement, the function, and the test item are related with one another. When there is the relevance, if any one of the related portions is modified, it may be needed to modify the other related portions. For example, if the requirement is modified, a function related to the modified requirement and a test item related to the modified requirement are also modified. Therefore, the file management apparatus 11 according to the first embodiment stores, in the format information 31, information on a cell containing information on an element to be associated, for each of description formats of documents. For example, the format information 31 is registered by a developer who generates a document or an administrator who manages the file management apparatus 11 via the input unit 22 or the terminal device 12. Furthermore, the format information 31 is referred to by the extracting unit 40 (to be described later) in order to extract an element to be associated.

FIG. 3 is a diagram illustrating an example of a data structure of the format information. As illustrated in FIG. 3, the format information 31 contains items of "Format type", "Key", and "Contents". The item of Format type is a field for storing a type of a description format of a document. In the first embodiment, in the item of Format type, a name indicating a type of a document generated in a corresponding format is stored as the type of the description format. The item of Key is a field for storing an item name of attribute information added to an element in the document. For example, in the document, attribute information, such as an identification (ID) and a number (No), for identifying an element is added to the element to write a requirement. In the item of Key, an item name of the attribute information contained in a document generated in a corresponding format is stored. The item of Contents is a field for storing an item name of a cell containing information on an element in the document. For example, in the document, an item for writing information on an element is provided and processing contents or the like is written in association with the attribute information. In the item of Contents, an item name of a portion where the information on the element is written is stored.

In the example in FIG. 3, a document of "functional requirement document A" has "ID" as the item name of the attribute information and "requirement" as the item name of the item where the information on the element is written. Furthermore, a document of "functional requirement document B" has "No" as the item name of the attribute information and "Description" as the item name of the item where the information on the element is written. Moreover, a document of "functional design document" has "ID" as the item name of the attribute information and "contents" as the item name of the item where the information on the element is written.

The element information 32 is data containing information on an element extracted from a document. For example, the element information 32 is stored by the extracting unit 40 (to be described later). Furthermore, the element information 32 is referred to by the extracting unit 40 (to be described later) in order to determine a related element.

FIG. 4 is a diagram illustrating an example of a data structure of the element information. As illustrated in FIG. 4, the element information 32 contains items of "Object ID", "Key", and "Detail". The item of Object ID is a field for storing identification information added to an extracted element. In the first embodiment, a unique ID number is assigned, as the identification information, to an element extracted from a document. Incidentally, if the same document as the registered document has already been registered, and the information of Key of the element extracted from the registered document has already been registered in the element information 32, the same ID number is added to the element. In the item of Object ID, the assigned ID number is stored. The item of Key is a field for storing attribute information extracted from the document. As described above, in the document, the attribute information, such as an ID or a No, is added to the elements. In the item of Key, the attribute information extracted from the document is stored. The item of Detail is a field for storing information on an element extracted from the document. As described above, in the document, the information on the element is written in association with the attribute information. In the item of Detail, information on the extracted element is stored.

In the example in FIG. 4, an Object ID of "0001" indicates that attribute information of "ID 001" and an element of "proceed" are extracted. Furthermore, an Object ID of "0004" indicates that attribute information of "No A" and an element of "requirement A" are extracted. Moreover, an Object ID of "0007" indicates that attribute information of "No 001-01" and an element of "function A" are extracted.

The file information 33 is data containing information on a file from which an element is extracted. For example, the file information 33 is stored by the extracting unit 40 (to be described later). Furthermore, the file information 33 is referred to by a searching unit 43 (to be described later) in order to specify a file to be influenced.

FIG. 5 is a diagram illustrating an example of a data structure of the file information. As illustrated in FIG. 5, the file information 33 contains items of "File Name" and "ID". The item of File Name is a field for storing information indicating a file from which an element is extracted. In the first embodiment, in the item of File Name, a name of a document from which an element is extracted is stored as the information indicating the file. The item of ID is a field for storing information for identifying the extracted element. In the first embodiment, attribute information on the extracted element is stored in the item of ID. Incidentally, it may be possible to store an ID number assigned to the extracted element in the item of ID.

In the example in FIG. 5, it is indicated that an ID of "ID 001" is extracted from the document of "functional requirement document A". Furthermore, it is indicated that an ID of "No A" is extracted from the document of "functional requirement document B". Moreover, it is indicated that an ID of "No 001-01" is extracted from the document of "functional design document".

The relation information 34 is data containing information on an associated element. For example, the relation information 34 is stored by an associating unit 42 (to be described later). Furthermore, the relation information 34 is referred to by the searching unit 43 (to be described later) in order to specify an area to be influenced.

FIG. 6 is a diagram illustrating an example of a data structure of the relation information. As illustrated in FIG. 6, the relation information 34 contains items of "Relation Parent ID" and "Relation Child ID". The item of Relation Parent ID is a field for storing information indicating one of associated elements. The item of Relation Child ID is a field for storing information indicating the other one of the associated elements. In the first embodiment, respective pieces of attribute information on the elements are stored in the items of Relation Parent ID and Relation Child ID. Incidentally, it may be possible to store respective ID numbers assigned to the elements in the items of Relation Parent ID and Relation Child ID. In the first embodiment, it is possible to determine a dependency relationship when associating the elements. In the item of Relation Parent ID, attribute information on a superordinate element in the dependency relationship is stored. In the item of Relation Child ID, attribute information on a subordinate element in the dependency relationship is stored.

In the example in FIG. 6, an element of "ID 001" and an element of "ID 001-01" are associated with each other, where the element of "ID 001" is a superordinate element and the element of "ID 001-01" is a subordinate element. Furthermore, the element of "ID 001" and an element of "ID 001-02" are associated with each other, where the element of "ID 001" is a superordinate element and the element of "ID 001-02" is a subordinate element. Moreover, an element of "ID 002" and an element of "ID 002-01" are associated with each other, where the element of "ID 002" is a superordinate element and the element of "ID 002-01" is a subordinate element.

Referring back to FIG. 2, the control unit 24 is a device that controls the file management apparatus 11. As the control unit 24, an electronic circuit, such as a central processing unit (CPU) or a micro processing unit (MPU), or an integrated circuit, such as an application specific integrated circuit (ASIC) or a field programmable gate array (FPGA), may be employed. The control unit 24 includes an internal memory for storing programs that define flows of various processes or for storing control data, and performs various processes with the programs and data. The control unit 24 functions as various processing units by executing various programs. For example, the control unit 24 includes the extracting unit 40, a determining unit 41, the associating unit 42, and the searching unit 43.

The extracting unit 40 extracts various types of information. For example, when a file of a document in a table format is registered in a folder for receiving registration of the document, the extracting unit 40 extracts an element from the table-format file according to a format of the document by referring to the format information 31. If the file contains information indicating a type of the document, the format of the document may be determined based on the information contained in the file. For example, if information indicating a description format of the document is contained in a file name of the file or in a specific cell, the extracting unit 40 specifies the description format based on the registered file. For example, if a name indicating the type of the document is contained in the file name of the file or in a specific cell, the extracting unit 40 specifies the description format based on the file name or the specific cell. Incidentally, the description format of the document may be designated by a developer. For example, if a file is registered in a folder for receiving registration of the document, the extracting unit 40 displays types of description formats of documents stored in the format information 31 onto the terminal device 12, and receives designation of a description format.

The extracting unit 40 obtains, from the format information 31, a portion where an element to be associated is extracted, based on the description format of the document. For example, the extracting unit 40 obtains an item name of attribute information to be extracted and an item name of a cell containing information on an element, by referring to the items of Key and Contents in the format information 31. Then, the extracting unit 40 searches for cells with the obtained item name in the registered file, and sequentially extracts pieces of data of the cells with the item names along a column. The data extraction is continued until a predetermined termination condition is satisfied. For example, the termination condition may be set such that the data extraction is terminated when a predetermined number of empty cells are continued. Furthermore, the termination condition may be set such that the data extraction is terminated when data extraction for a predetermined number of cells is completed. It may be possible to provide a single termination condition for all of the documents, or provide different termination conditions for different types of the documents.

The extracting unit 40 assigns a unique ID number to the extracted attribute information and the extracted information on the element corresponding to the attribute information, and stores the ID number in association with the attribute information and the information on the element corresponding to the attribute information in the element information 32. Furthermore, the extracting unit 40 stores the attribute information and a document name of a file from which the element is extracted, in the file information 33 in an associated manner.

Figure 7:
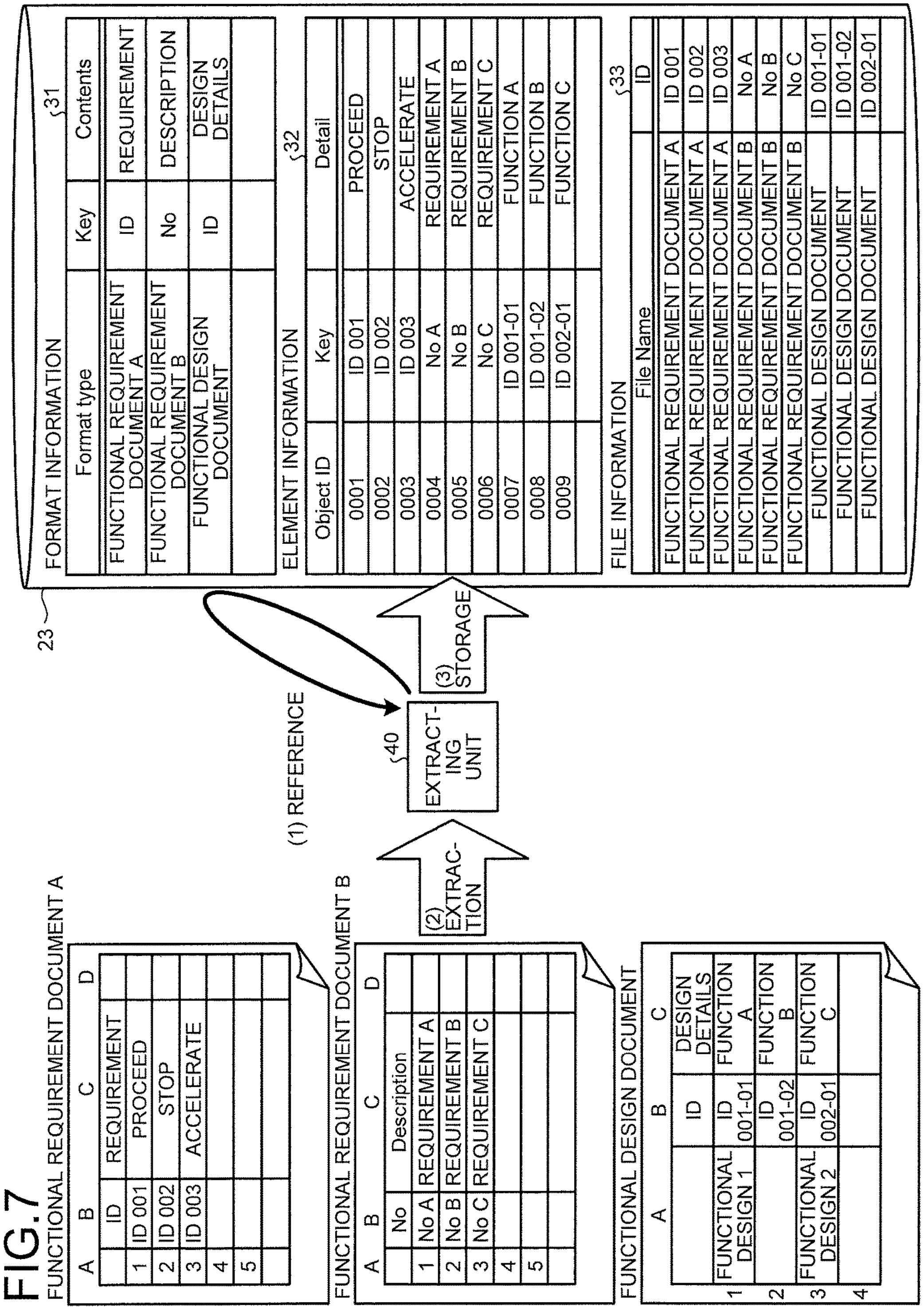
FIG. 7 is a diagram illustrating an example of the flow to extract attribute information and information on an element corresponding to the attribute information.

FIG. 7 is a diagram illustrating an example of the flow to extract the attribute information and the information on the element corresponding to the attribute information. When a file of a document in a table format is registered, the extracting unit 40 specifies an item name of an item to be extracted, by referring to the format information 31. For example, as illustrated in FIG. 7, when the functional requirement document A is registered, the extracting unit 40 specifies the items of "ID" and "requirement" as extraction objects by referring to the format information 31. Furthermore, when the functional requirement document B is registered, the extracting unit 40 specifies the items of "No" and "Description" as extraction objects by referring to the format information 31. Moreover, when the functional design document is registered, the extracting unit 40 specifies the items of "ID" and "design details" as extraction objects by referring to the format information 31.

Subsequently, the extracting unit 40 extracts pieces of data of the items with the item names specified as the extraction objects from the registered files. In the example in FIG. 7, the extracting unit 40 extracts pieces of data of the items of "ID" and "requirement" from the functional requirement document A. Furthermore, the extracting unit 40 extracts pieces of data of the items of "No" and "Description" from the functional requirement document B. Moreover, the extracting unit 40 extracts pieces of data of the items of "ID" and "design details" from the functional design document. As described above, the extracting unit 40 extracts pieces of data of items with the item names specified as the extraction objects from the registered files. Consequently, the extracting unit 40 can extract data regardless of a written position of the data as long as the registered document contains the data of the item with the item name specified as the extraction object. Namely, the extracting unit 40 can extract the data of the item being the extraction object even when the position of a cell of the data of the item being the extraction object is not fixed in the document.

The extracting unit 40 assigns a unique ID number to the extracted attribute information and the extracted information on the element corresponding to the attribute information, and stores the ID number in association with the attribute information and the information on the element corresponding to the attribute information in the element information 32. Furthermore, the extracting unit 40 stores the attribute information and the document name of the file from which the element has been extracted, in the file information 33 in an associated manner. Therefore, in the example in FIG. 7, the items of "ID 001" and "proceed" are extracted from the functional requirement document A, and the ID number of "0001" is assigned to the extracted items. Subsequently, the items of "0001", "ID 001", and "proceed" are stored in the element information 32 in an associated manner. Then, the items of "functional requirement document A" and "ID 001" are stored in the file information 33 in an associated manner. Furthermore, the items of "No A" and "requirement A" are extracted from the functional requirement document B, and the ID number of "0004" is assigned to the extracted items. Subsequently, the items of "0004", "No A", and "requirement A" are stored in the element information 32 in an associated manner. Then, the items of "functional requirement document B" and "No A" are stored in the file information 33 in an associated manner. Moreover, the items of "ID 001-01" and "function A" are extracted from the functional design document, and the ID number of "0007" is assigned to the extracted items. Subsequently, the items of "0007", "ID 001-01", and "function A" are stored in the element information 32 in an associated manner. Then, the items of "functional design document" and "ID 001-01" are stored in the file information 33 in an associated manner. Incidentally, it may be possible to store ID numbers in the item of ID in the file information 33.

Referring back to FIG. 2, the determining unit 41 performs various types of determination. For example, the determining unit 41 refers to the element information 32 and compares pieces of information stored in the element information 32, to thereby determine a relevance between files. For example, the determining unit 41 reads pieces of information stored in the item of Key from the element information 32. Then, the determining unit 41 compares each of the read pieces of the information with the other read pieces of the information to determine whether the pieces of the information entirely or partially match each other. If the pieces of the information entirely or partially match each other, the determining unit 41 determines that there is a relevance. Incidentally, for example, the determining unit 41 may read pieces of information stored in the item of Detail from the element information 32, and compare each of the read pieces of the information with the other read pieces of the information to determine a relevance. Furthermore, the determining unit 41 may compare the pieces of the information in the items of Key and Detail, and, if the pieces of the information in each of the items of Key and Detail entirely or partially match each other, the determining unit 41 may determine that there is a relevance.

The associating unit 42 makes various types of association. For example, the associating unit 42 associates elements that are determined as related elements by the determining unit 41. For example, the associating unit 42 reads, from the element information 32, pieces of information in the item of Key of the elements determined as related elements, and registers the read pieces of the information on the related elements in the relation information 34 in an associated manner.

Figure 8:
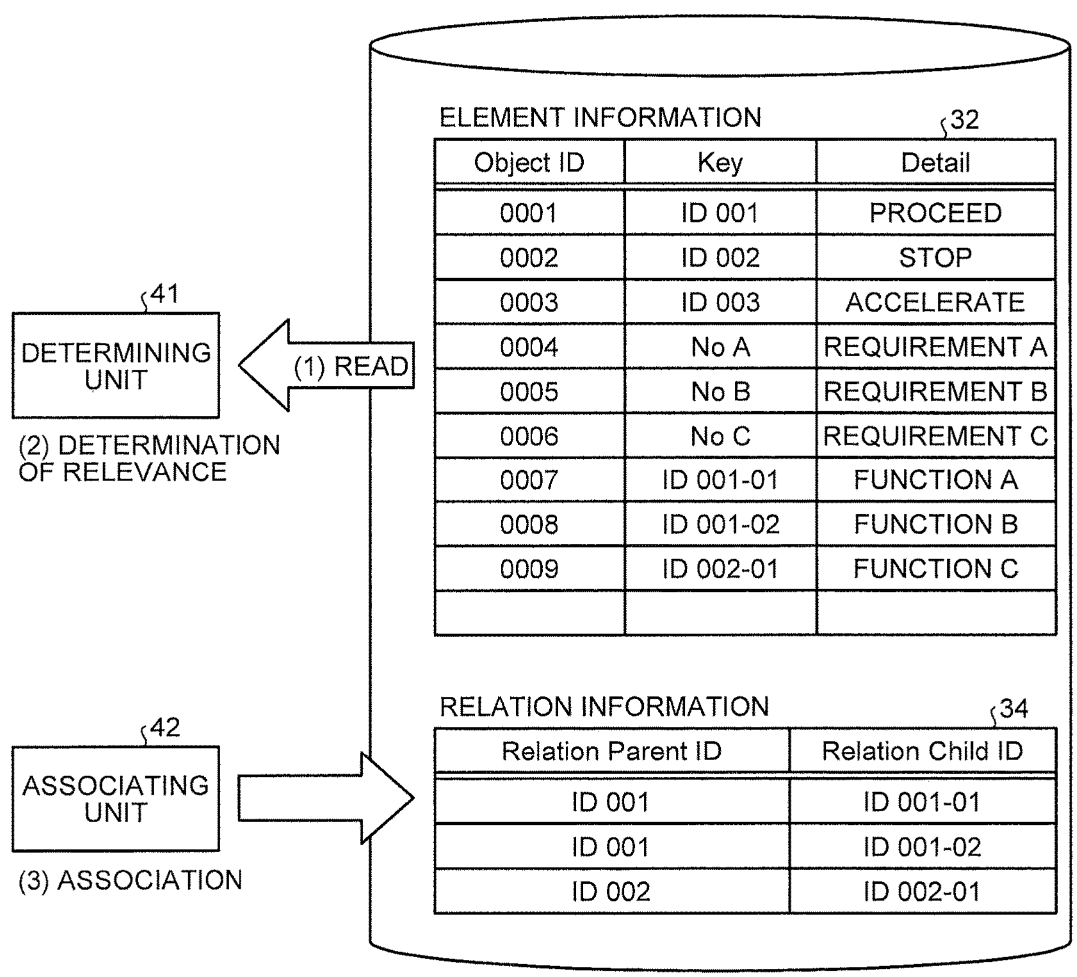
FIG. 8 is a diagram illustrating an example of the flow to associate elements of documents.

FIG. 8 is a diagram illustrating an example of the flow to associate elements of documents. The determining unit 41 reads pieces of information stored in the item of Key from the element information 32. In the example in FIG. 8, "ID 001", "ID 002", "ID 003", "No A", "No B", "No C", "ID 001-01", "ID 001-02", and "ID 002-01" stored in the item of Key are read. The determining unit 41 compares each of the read pieces of the information with the other read pieces of the information to determine whether the pieces of the information entirely or partially match each other. In the example in FIG. 8, "ID 001" and "ID 001-01" partially match each other, "ID 001" and "ID 001-02" partially match each other, and "ID 002" and "ID 002-01" partially match each other; therefore, it is determined that the pieces of the information are related to each other. The associating unit 42 reads the pieces of the information stored in the item of Key of the elements determined as related elements, and registers the piece of the information on the related elements in the relation information 34 in an associated manner. Specifically, in the example in FIG. 8, "ID 001" and "ID 001-01", "ID 001" and "ID 001-02", and "ID 002" and "ID 002-01" are registered in the relation information 34 in an associated manner. Incidentally, when associating the pieces of the information, the associating unit 42 may store ID numbers of the elements to be associated in the items of Relation Parent ID and Relation Child in the relation information 34. Alternatively, the associating unit 42 may display the elements determined as related elements, display a designation screen for receiving designation of elements to be associated with each other, and associate the elements designated via the designation screen.

FIG. 9 is a diagram illustrating an example of the designation screen. As illustrated in FIG. 9, a designation screen 60 displays separate folders for different types of documents, and displays registered documents and elements of the documents in a tree structure. In the example in FIG. 9, the designation screen 60 displays a folder for a functional design and a folder for a functional requirement. Furthermore, the designation screen 60 displays a functional design document A and a functional design document B as registered documents for the functional design, and displays a functional requirement document as a registered document for the functional requirement. Moreover, the designation screen 60 displays a function 1 and a function 2 extracted as elements of the functional design document A, displays a function 3 extracted as an element of the functional design document B, and displays a functional requirement A and a functional requirement B extracted as elements of the functional requirement document. In the example in FIG. 9, it is determined that the function 1 of the functional design document A and the functional requirement A of the functional requirement document are related to each other. The designation screen 60 displays a dashed line 61 indicating that the function 1 of the functional design document A and the functional element A of the functional requirement document are related to each other and they are candidate elements to be associated with each other. When associating the elements displayed as the candidate elements to be associated, a developer designates the dashed line 61. The associating unit 42 reads pieces of information stored in the item of Key of the elements designated to be associated, and registers the read pieces of the information on the elements in the relation information 34 in an associated manner. Incidentally, the dependency relationship between the elements to be associated may be set such that the element of the document generated by an upstream process in the development flow serves as a superordinate element, and the element of the document generated in a downstream process serves as a subordinate element. For example, process information indicating types of documents generated in sequence in the development flow may be stored in the storage unit 23. The associating unit 42 may determine the dependency relationship between the elements to be associated based on the process information stored in the storage unit 23. Alternatively, a developer may designate the dependency relationship between the elements to be associated via a screen. For example, as illustrated in FIG. 9, if the elements to be associated are designated via the designation screen 60, a designation screen 65 for designating a dependency relationship may be displayed to enable to designate the dependency relationship via the designation screen 65. As illustrated in FIG. 9, the designation screen 65 contains radio buttons 66 and 67 for designating a dependency relationship between elements. The radio button 66 indicates that the function 1 of the functional design document A serves as a superordinate element and the functional requirement A of the functional requirement document serves as a subordinate element. The radio button 67 indicates that the function 1 of the functional design document A serves as a subordinate element and the functional requirement A of the functional requirement document serves as a superordinate element. The developer selects one of the radio buttons 66 and 67 in the designation screen 65 according to the dependency relationship used for the registration. The associating unit 42 associates the elements according to the dependency relationship selected via the designation screen 65.

Figure 10:
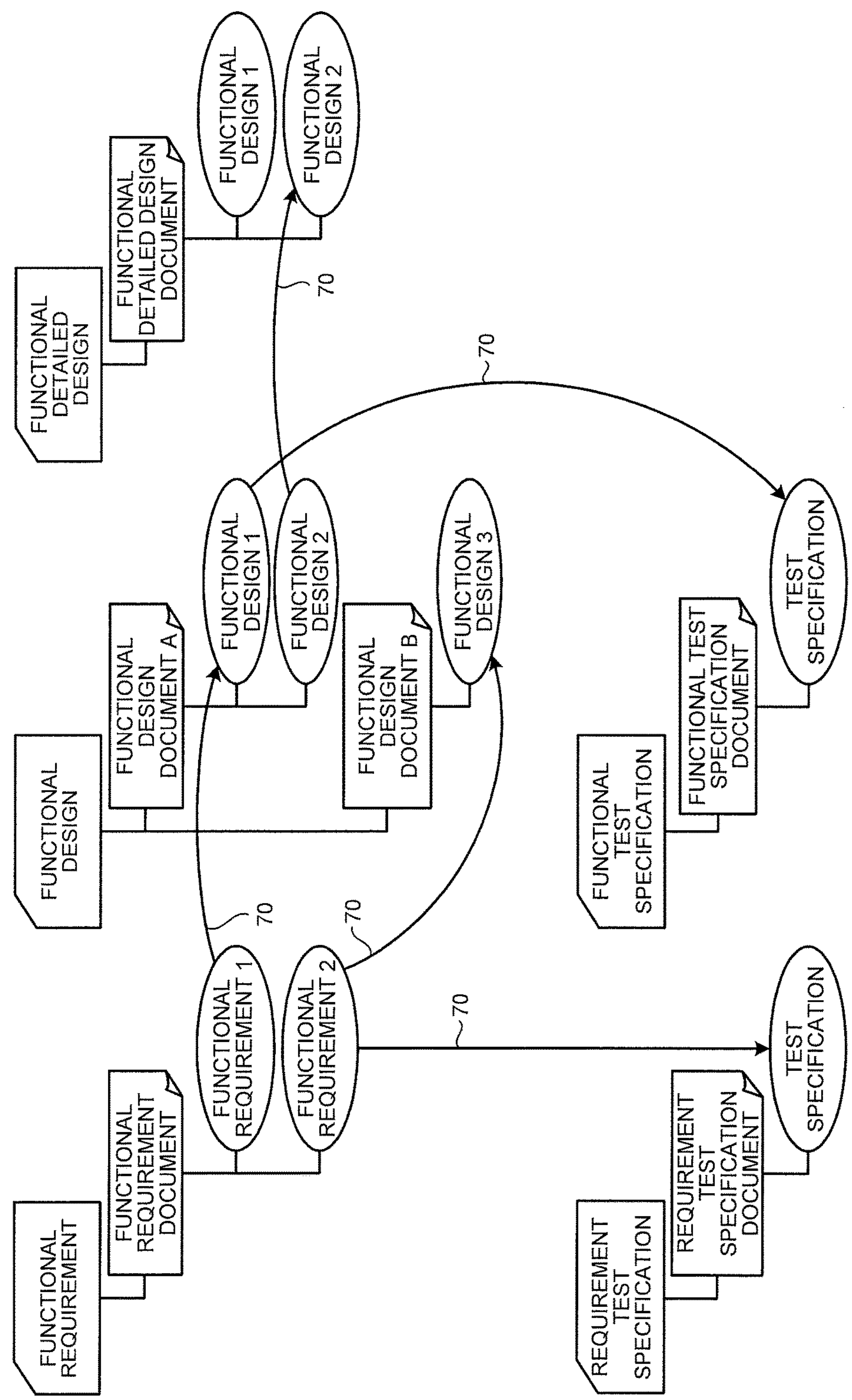
FIG. 10 is a diagram illustrating an example of association between various documents.

An example of association between various documents generated during development will be described below. FIG. 10 is a diagram illustrating an example in which various documents are associated with one another. In the example in FIG. 10, separate folders are provided for different types of documents, and registered documents and elements of the documents are provided in a tree structure. In the example in FIG. 10, folders are provided for a functional requirement, a functional design, a functional detailed design, a functional test specification, and a requirement test specification. Furthermore, in the example in FIG. 10, the functional requirement document is provided as a document of the functional requirement, the functional design document A and the functional design document B are provided as documents of the functional design, a functional detailed design document is provided as a document of the functional detailed design, a functional test specification document is provided as a document of the functional test specification, and a requirement test specification document is provided as a document of the requirement test specification. Moreover, in the example in FIG. 10, a functional requirement 1 and a functional requirement 2 are provided as elements of the functional requirement document, a functional design 1 and a functional design 2 are provided as elements of the functional design document A, a functional design 3 is provided as an element of the functional design document B, a detailed design 1 and a detailed design 2 are provided as elements of the functional detailed design document, a test specification is provided as an element of the functional test specification document, and a test specification is provided as an element of the requirement test specification document. In the example in FIG. 10, the associated elements are connected by relations 70. In the example in FIG. 10, the functional requirement 1 of the functional requirement document and the functional design 1 of the functional design document A are associated with each other. Furthermore, the functional requirement 2 of the functional requirement document and the functional design 3 of the functional design document B are associated with each other. Moreover, the functional design 2 of the functional design document A and the detailed design 2 of the functional detailed design document are associated with each other. Furthermore, the functional design 1 of the functional design document A and the test specification of the functional test specification document are associated with each other. Moreover, the functional requirement 2 of the functional requirement document and the test specification of the requirement test specification document are associated with each other.

The documents generated through the development contain a large number of various types of information, and multiple description formats are employed. Therefore, it takes effort and time for a developer to search for an item to be managed. Furthermore, a large number of documents are generated through the development. Therefore, it is difficult for the developer to manage association between items to be managed.

Therefore, the file management apparatus 11 stores, in the format information 31, pieces of information on elements to be associated in table-format files, for each of the description formats of documents. If a document is registered, the file management apparatus 11 extracts elements from the document based on the format of the registered document. Therefore, the file management apparatus 11 can extract pieces of information on the elements to be associated from among a large number of pieces of information contained in the documents. Furthermore, the file management apparatus 11 compares the pieces of the information on the extracted elements to determine a relevance. Therefore, the file management apparatus 11 can specify related elements from among a large number of the extracted elements, and therefore can assist the association operation.

Referring back to FIG. 2, the searching unit 43 performs various searches. For example, the searching unit 43 receives a search request for an area to be influenced, together with designation of an element of a document. For example, the searching unit 43 displays a condition screen for designating a search condition on the terminal device 12, and receives a search request for an area to be influenced via the condition screen.

Figure 11:
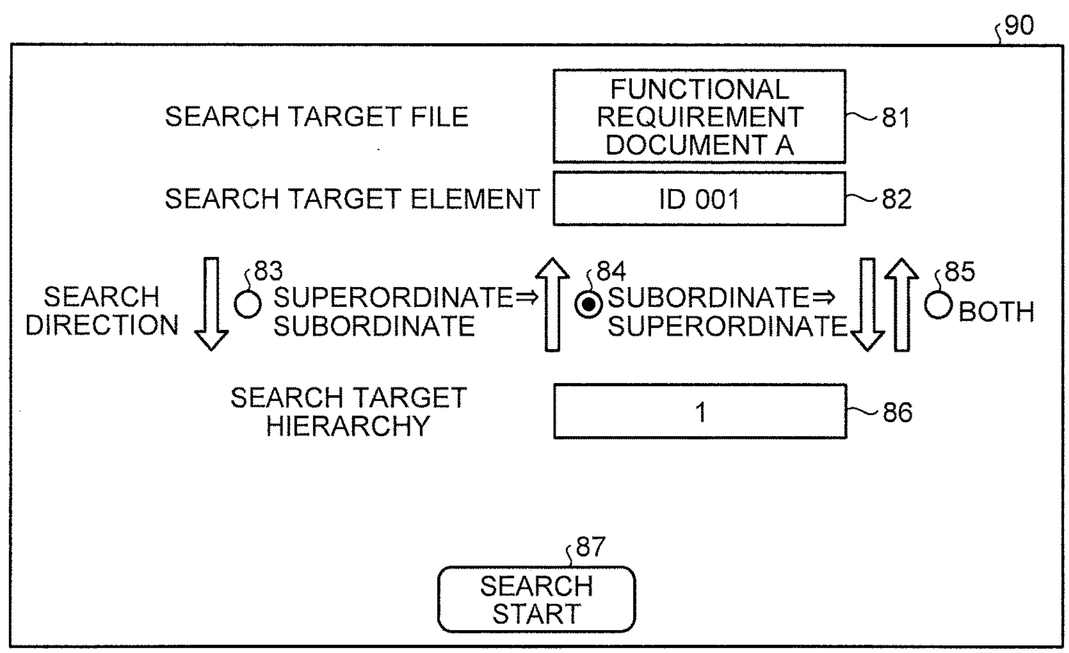
FIG. 11 is a diagram illustrating an example of a condition screen.

FIG. 11 is a diagram illustrating an example of the condition screen. A condition screen 80 includes an input field 81 for designating a target file that serves as a search start point and an input field 82 for designating a target element that serves as a search start point. In the input field 81, a target file that serves as the search start point is input. In the input field 82, a target element that serves as the search start point is input. Incidentally, it may be possible to display candidate files and elements in the input field 81 and the input field 82 such that a file and an element can be designated by selection. For example, files registered in the file information 33 are displayed in the input field 81. Then, pieces of attribute information on elements registered in the file information 33 are displayed in the input field 82, and, if a file is selected in the input field 81, pieces of attribute information on elements contained in the selected file are displayed. Furthermore, the condition screen 80 includes radio buttons 83, 84, and 85 for designating a dependency relationship between search target elements. The radio button 83 indicates a search for elements that are associated with a search target element based on only a superordinate-to-subordinate dependency relationship in which the search target element serves as a superordinate element. The radio button 84 indicates a search for elements that are associated with the search target element based on only a subordinate-to-superordinate dependency relationship in which the search target element serves as a subordinate element. The radio button 85 indicates a search for elements that are associated with the search target element based on any of the dependency relationships. Moreover, the condition screen 80 includes an input field 86 for designating the number of hierarchies to be employed as a search scope. If a large number of elements are associated with one another, in some cases, the search target element may be associated with other elements in a hierarchical manner; for example, elements associated with the search target element may be associated with other elements, and the other elements may be associated with still other elements. In the input field 86, the number of hierarchies with respect to the search target element is designated as a search scope of associated elements. For example, if a single hierarchy is designated, elements directly associated with the search target element serve as a search scope. The condition screen 80 includes a button 87 for designating a start of a search. A developer designates a target file and a target element each serving as a search start point, the dependency relationship of the search target element, and the search scope, and then designates the button 87 to request a search via the condition screen 80.

When a search is requested, the searching unit 43 searches for, as an area to be influenced, elements associated with designated elements according to search conditions designated via the condition screen 80.

FIG. 12 is a diagram illustrating an example of the flow to search for an area to be influenced. In the example in FIG. 12, a requirement of "proceed" is written for an ID of "ID 001" in the functional requirement document A. Furthermore, a requirement of "stop" is written for an ID of "ID 002", and a requirement of "stop" is written for an ID of "ID 003". Moreover, in the example in FIG. 12, design details of "function A" is written for an ID of "ID 001-01" of the functional design 1 in the functional design document. Furthermore, design details of "function B" is written for an ID of "ID 001-02", and design details of "function C" is written for an ID of "ID 002-01" of the functional design 2. In the example in FIG. 12, "function A" and "function B" are associated with the requirement of "proceed". When receiving a search request for an area to be influenced, together with designation of a requirement, the searching unit 43 searches for requirements associated with the designated requirement, and outputs the requirement obtained by the search and documents containing the requirements obtained by the search, as the area to be influenced. In the example in FIG. 12, when receiving a search request for an area to be influenced by the requirement of "proceed" of the functional design document, the searching unit 43 outputs, on a search result display screen, "function A", "function B", and the functional design document containing "function A" and "function B", as the area to be influenced.

Incidentally, in the development of an automobile, the International Organization for Standardization (ISO) 26262 is defined as an automotive functional safety standard. The file management apparatus 11 extracts elements to be associated from registered documents, and manages the elements in an associated manner. Therefore, even if any of the elements need to be modified, it is possible to specify an area to be influenced by the modified element. Consequently, the file management apparatus 11 can support development compliant with ISO 26262.

Figure 13:
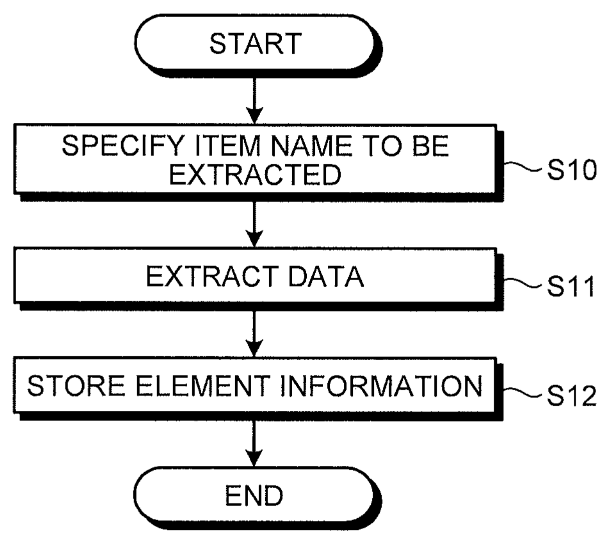
FIG. 13 is a flowchart illustrating the flow of an extraction process.

The flow of an extraction process for extracting an element from a document by the file management apparatus 11 according to the first embodiment will be explained below. FIG. 13 is a flowchart illustrating the flow of the extraction process. The extraction process is performed at a timing at which, for example, a document is registered in a folder for receiving registration of the document. Incidentally, the extraction process may be performed at regular time intervals by batch processing or the like. Furthermore, the extraction process may be performed at a timing designated by an administrator.

As illustrated in FIG. 13, the extracting unit 40 specifies an item name of attribute information to be extracted and an item name of a cell in which information on an element is written, from the format information 31 based on the description format of the registered document (S10). The extracting unit 40 extracts data of the item of the item name designated as an extraction object from the registered file (S11). The extracting unit 40 assigns a unique ID number to the extracted attribute information and the extracted information on the element corresponding to the attribute information, and stores the ID number in association with the attribute information and the information on the element corresponding to the attribute information in the element information 32 (S12), and then the process is terminated.

Next, the flow of an association process for associating elements by the file management apparatus 11 according to the first embodiment will be explained below. FIG. 14 is a flowchart illustrating the flow of the association process. The association process is performed at a timing at which, for example, the extraction process is completed. Incidentally, the association process may be performed at regular time intervals by batch processing or the like. Furthermore, the association process may be performed at a timing designated by an administrator.

As illustrated in FIG. 14, the determining unit 41 reads pieces of information stored in the item of Key from the element information 32 (S20). The determining unit 41 selects, as process-target information, a piece of information that has not been selected as the process-target information from among the read pieces of the information (S21). The determining unit 41 sequentially selects pieces of information other than the process-target information selected at S21, from among the read pieces of the information (S22). The determining unit 41 determines whether the process-target information selected at S21 and the selected information selected at S22 have been compared with each other (S23). If the comparison has been completed (YES at S23), the process proceeds to S26 to be described later.

In contrast, if the comparison has not been completed (NO at S23), the determining unit 41 compares the process-target information and the selected information to determine whether the pieces of the information entirely or partially match each other (S24). If the pieces of the information do not entirely or partially match each other (NO at S24), the process proceeds to S26 to be described later.

In contrast, if the pieces of the information entirely or partially match each other (YES at S24), the associating unit 42 reads pieces of information stored in the item of Key of the elements for which the pieces of the information entirely or partially match each other, and registers the read pieces of the information on the elements in the relation information 34 in an associated manner (S25).

The determining unit 41 determines whether the process-target information has been compared with all of the read pieces of the information other than the process-target information (S26). If the comparison has not been completed (NO at S26), the process proceeds to S22 as described above, and a next piece of information is selected.

In contrast, if the comparison has been completed (YES at S26), the determining unit 41 determines whether all of the read pieces of the information have already been selected as the process-target information (S27). If there is a piece of information that has not been selected as the process-target information from among the read pieces of the information (NO at S27), the process proceeds to S21 as described above.

In contrast, if all of the read pieces of the information have been selected as the process-target information (YES at S27), the process is terminated.

Figure 15:
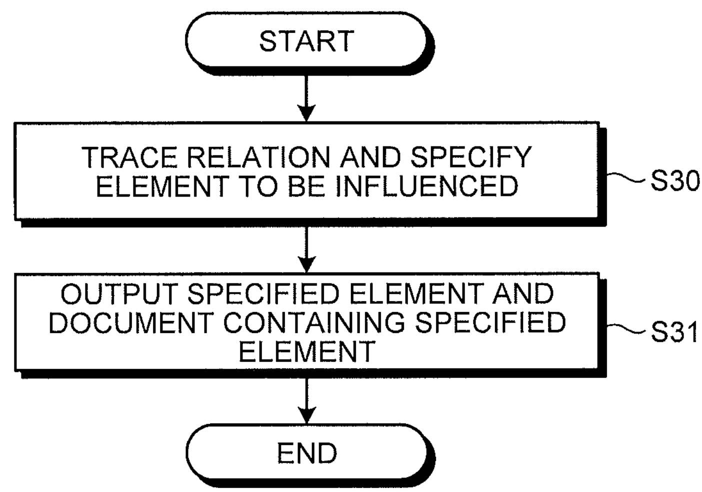
FIG. 15 is a flowchart illustrating the flow of a search process.

Next, the flow of a search process performed by the file management apparatus 11 according to the first embodiment to search for an area to be influenced will be explained below. FIG. 15 is a flowchart illustrating the flow of the search process. The search process is performed at a timing at which, for example, a search request is received.

As illustrated in FIG. 15, the searching unit 43 specifies an element to be influenced by tracing the elements associated with the designated element, according to the designated search condition (S30). The searching unit 43 displays the specified element and a document containing the specified element, as the area to be influenced (S31), and the process is terminated.

As described above, the file management apparatus 11 compares first information associated with attribute information on a first file in a table format and second information associated with attribute information on a second file in a table format, to thereby determine a relevance between the first file and the second file. Therefore, the file management apparatus 11 can support association of files.

Furthermore, the file management apparatus 11 determines that there is a relevance when pieces of information on the elements to be compared entirely or partially match each other. Therefore, the file management apparatus 11 can associate elements that are related to each other.

Moreover, the file management apparatus 11 extracts attribute information and information to be associated with the attribute information from files in a table format, in accordance with the description formats of documents. Then, the file management apparatus 11 stores the extracted attribute information and the extracted information to be associated with the attribute information in the element information 32 in an associated manner. Therefore, the file management apparatus 11 can extract information on an element to be associated from a table-format file.

[b] Second Embodiment

While the embodiments of the present invention have been described above, the present invention may be embodied in various forms other than the above-described embodiments. The other embodiments will be described below.

For example, while, in the embodiment, an example has been explained in which the elements are associated with one another, the present invention is not limited to this example. For example, it may be possible to associate elements and associate files.

Furthermore, while, in the embodiment, an example has been explained in which a requirement to be influenced and a file containing the requirement to be influenced are displayed, as an area to be influenced, as a result of the search, the preset invention is not limited to this example. For example, only one of the requirement and the file may be displayed.

Moreover, while, in the embodiment, an example has been explained in which item names of elements to be associated are stored, and pieces of data of the items of the item names are extracted as information on the elements, the present invention is not limited to this example. For example, it may be possible to store area information indicating an area in which information on elements to be associated is stored, and may extract data in the area indicated by the area information in a file.

Furthermore, the components illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. For example, the processing units of the extracting unit 40, the determining unit 41, the associating unit 42, and the searching unit 43 illustrated in FIG. 2 may be integrated or separated appropriately. Furthermore, for each processing function performed by each processing unit, all or any part of the processing function may be implemented by a CPU and a program analyzed and executed by the CPU or may be implemented as hardware by wired logic.

File Management Program

Figure 16:
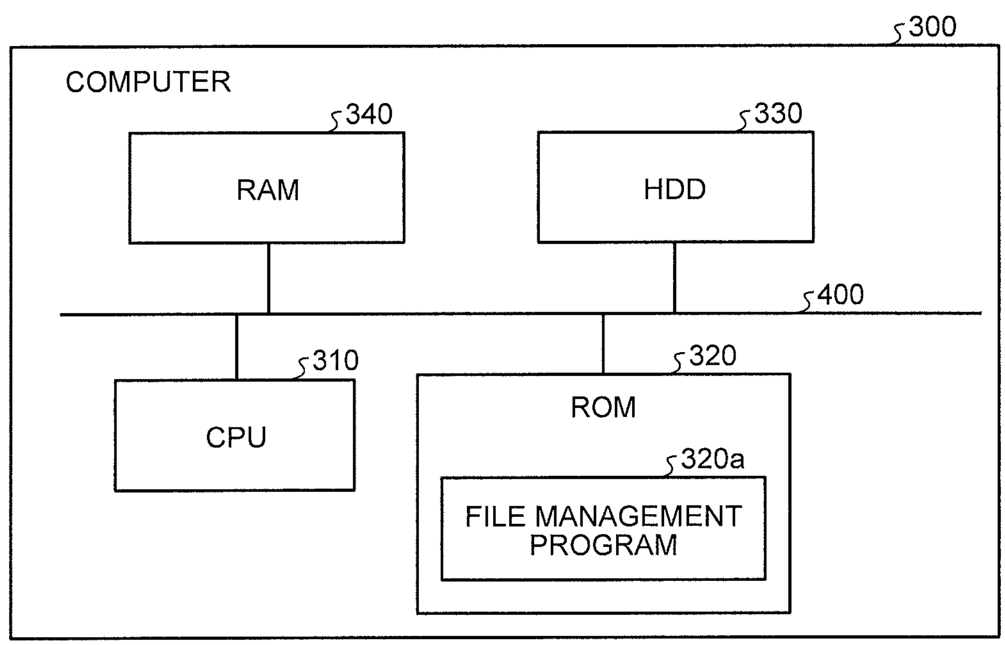
FIG. 16 is a diagram illustrating a computer that executes a file management program.

Various processes explained in the above embodiments may be implemented by causing a computer system, such as a personal computer or a workstation, to execute a program that is prepared in advance. Therefore, an example of the computer system that executes a program having the same functions as those of the embodiments will be explained below. FIG. 16 is a diagram illustrating a computer that executes a file management program.

As illustrated in FIG. 16, a computer 300 includes a CPU 310, a read only memory (ROM) 320, a hard disk drive (HDD) 330, and a RAM 340. The units 310 to 340 are connected to one another via a bus 400.

The ROM 320 stores therein, in advance, a file management program 320*a* that implements the same functions as those of the processing units of the above embodiments. For example, the file management program 320*a* implements the same functions as those of the extracting unit 40, the determining unit 41, the associating unit 42, and the searching unit 43 of the above embodiments. Meanwhile, the file management program 320*a* may be separated appropriately.

The HDD 330 stores therein various types of data. For example, the HDD 330 stores therein an OS or various types of data used to manage files.

The CPU 310 reads the file management program 320*a* from the ROM 320 and executes the program, to thereby implement the same operations as those of the processing units of the embodiments. Specifically, the file management program 320*a* implements the same operations as those of the extracting unit 40, the determining unit 41, the associating unit 42, and the searching unit 43 of the embodiments.

Incidentally, the file management program 320*a* described above need not always be stored in the ROM 320 from the beginning. The file management program 320*a* may be stored in the HDD 330.

For example, the program may be stored in a "portable physical medium", such as a flexible disk (FD), a compact disk-ROM (CD-ROM), a digital versatile disk (DVD), a magnetooptical disk, or an integrated circuit (IC) card, that is insertable into the computer 300. Then, the computer 300 reads the program from the medium and executes the program.

Alternatively, the program may be stored in "other computers (or servers)" connected to the computer 300 via a public line, the Internet, a local area network (LAN), or a wide area network (WAN). Then, the computer 300 reads the program from the other computers or servers and executes the program.

It is possible to support association of files.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a file management program for causing a computer to execute a process, the process comprising:

referring to a storage unit that stores therein information corresponding to a cell contained in a file in a table format and attribute information on the file in an associated manner, the table format including more than one table format;

determining, when first information included in a first file is stored in the storage unit in association with attribute information on the first file in the table format and second information included in a second file is stored in the storage unit in association with attribute information on the second file in the table format, whether there is a relevance between the first information included in the first file and the second information included in the second file by comparing the first information and the second information;

displaying, on a display unit, a screen allowing a designation of one of a plurality of types of dependency relationships between the first information and the second information when the determining determines that there is a relevance between the first information included in the first file and the second information included in the second file;

storing the designated dependency relationship, storing, in response to an input, a second dependency relationship between third information included in the first file and stored in the storage unit in association with other attribute information on the first file and fourth information included in the second file and stored in the storage unit in association with other attribute information on the second file, the second dependency relationship being different from the dependency relationship between the first information and the second information stored in the storage unit;

searching, in response to an input and by referring to the storage unit, an element included in any of a plurality of files stored in the storage unit and influenced by a change in an element identified in the input, whether there is an influence or not being determined based on the dependency relationship stored in the storage unit and identified in the input; and outputting a result of the searching.

2. The non-transitory computer-readable recording medium according to claim 1, wherein the determining includes determining that there is the relevance when the first information and the second information entirely or partially match each other.

3. The non-transitory computer-readable recording medium according to claim 1, wherein the process further comprises:

extracting attribute information and information to be associated with the attribute information from a file in a table format by referring to a format storage unit that stores therein attribute information on a file in a table format and information on a cell containing information to be associated with the attribute information for each of description formats of documents; and storing the extracted attribute information and the extracted information to be associated with the attribute information in the storage unit in an associated manner, wherein the determining includes determining a relevance between two files, as the first file and the second file, for each of which information is stored in the storage unit in association with attribute information.

4. The non-transitory computer-readable recording medium according to claim 1, wherein the process further comprises:

storing an association between the first information and the second information in a hierarchical manner in the storage unit when it is determined that there is a relevance between the first file and the second file; and receiving an input of a designation of a file and a cell as a search start point, and a number of hierarchies to be searched; and searching information stored in the storage unit based on the received input.

5. A file management apparatus comprising:

a memory that stores therein information corresponding to a cell contained in a file in a table format, in association with attribute information on the file, the table format including more than one table format; and at least one processor coupled to the memory to perform a process comprising:

determining, when first information included in a first file is stored in the storage unit in association with attribute information on the first file in the table format and second information included in a second file is stored in the storage unit in association with attribute information on the second file in the table format, whether there is a relevance between the first information included in the first file and the second information included in the second file by comparing the first information and the second information by referring to the storage unit;

displaying, on a display unit, a screen allowing a designation of one of a plurality of types of dependency relationships between the first information and the second information when the determining determines that there is a relevance between the first information included in the first file and the second information included in the second file;

storing the designated dependency relationship, storing, in response to an input, a second dependency relationship between third information included in the first file and stored in the storage unit in association with other attribute information on the first file and fourth information included in the second file and stored in the storage unit in association with other attribute information on the second file, the second dependency relationship being different from the dependency relationship between the first information and the second information stored in the storage unit;

searching, in response to an input and by referring to the storage unit, an element included in any of a plurality of files stored in the storage unit and influenced by a change in an element identified in the input, whether there is an influence or not being determined based on the dependency relationship stored in the storage unit and identified in the input; and outputting a result of the searching.

6. The file management apparatus according to claim 5, wherein the process further comprises:

storing an association between the first information and the second information in a hierarchical manner in the storage unit when it is determined that there is a relevance between the first file and the second file; and receiving an input of a designation of a file and a cell as a search start point, and a number of hierarchies to be searched; and searching information stored in the storage unit based on the received input.

7. A file management method comprising:

referring, by a computer, to a storage unit that stores therein information corresponding to a cell contained in a file in a table format and attribute information on the file in an associated manner, the table format including more than one table format;

determining, by a computer, when first information included in a first file is stored in the storage unit in association with attribute information on the first file in the table format and second information included in a second file is stored in the storage unit in association with attribute information on the second file in the table format, whether there is a relevance between the first information included in the first file and the second information included in the second file by comparing the first information and the second information;

displaying on a display unit, by a computer, a screen allowing a designation of one of a plurality of types of dependency relationships between the first information and the second information when the determining determines that there is a relevance between the first information included in the first file and the second information included in the second file;

storing the designated dependency relationship, storing, in response to an input, a second dependency relationship between third information included in the first file and stored in the storage unit in association with other attribute information on the first file and fourth information included in the second file and stored in the storage unit in association with other attribute information on the second file, the second dependency relationship being different from the dependency relationship between the first information and the second information stored in the storage unit;

searching, in response to an input and by referring to the storage unit, an element included in any of a plurality of files stored in the storage unit and influenced by a change in an element identified in the input, whether there is an influence or not being determined based on the dependency relationship stored in the storage unit and identified in the input; and outputting a result of the searching.

8. The file management method according to claim 7, further comprising:

storing, by a computer, an association between the first information and the second information in a hierarchical manner in the storage unit when it is determined that there is a relevance between the first file and the second file; and receiving, by a computer, an input of a designation of a file and a cell as a search start point, and a number of hierarchies to be searched; and searching, by a computer, information stored in the storage unit based on the received input.

* * * * *